US006528574B1

(12) United States Patent
Levy et al.

(10) Patent No.: US 6,528,574 B1
(45) Date of Patent: Mar. 4, 2003

(54) BLENDS OF AQUEOUS DISPERSIONS OF FLUOROPOLYMERS AND AQUEOUS DISPERSIONS OF ETHYLENE/ACID OR IONOMERIC COPOLYMERS

(75) Inventors: Daniel N. Levy, Collex/Geneva (CH); Eleni Karayianni, Geneva (CH)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/266,327

(22) Filed: Mar. 11, 1999

(51) Int. Cl.[7] ............................................. C08L 27/00
(52) U.S. Cl. ..................................................... 524/520
(58) Field of Search .......................................... 524/520

(56) References Cited

U.S. PATENT DOCUMENTS

| | | | |
|---|---|---|---|
| 5,013,792 A | 5/1991 | Chapman, Jr. et al. | 525/166 |
| 5,707,569 A | 1/1998 | Priester et al. | 264/39 |
| 5,744,539 A | 4/1998 | McCoy et al. | 524/546 |
| 5,879,804 A | 3/1999 | Tsubuku | 428/402 |

FOREIGN PATENT DOCUMENTS

| | | | |
|---|---|---|---|
| EP | 0 964 037 A1 | 12/1999 | C09D/127/12 |
| WO | 98/38258 | 9/1998 | C09D/127/12 |

*Primary Examiner*—Peter D. Mulcahy

(57) ABSTRACT

This invention relates to an aqueous dispersion of (a) from 0.5 to 99.5 weight percent of a fluoropolymer having an average particle size of from 0.01 to 30 microns; and (b) from 0.5 to 99.5 weight percent of an ethylene copolymer which comprises at least 50% by weight ethylene, 1–35% by weight of an acid-containing unsaturated mono-carboxylic acid, and optionally 0–49% by weight of a moiety selected from at least one of alkyl acrylate, alkyl methacrylate, vinyl ether, carbon monoxide and sulfur dioxide, and further wherein the acid groups are neutralized from 0–100% by a metal ion or other cations, the weight percents being based on the total amounts of (a) and (b) only. The invention also relates to a coprecipate of this aqueous dispersion and a dry powder made by drying the aqueous dispersion or coprecipitate.

18 Claims, 1 Drawing Sheet

BLENDS OF AQUEOUS DISPERSIONS OF FLUOROPOLYMERS AND AQUEOUS DISPERSIONS OF ETHYLENE/ACID OR IONOMERIC COPOLYMERS

BACKGROUND OF THE INVENTION

1. Field of the Invention

The present invention relates to compositions that include fluoropolymers.

2. Description of the Related Art

Fluoropolymers are well known materials. As used herein the term "fluoropolymers" includes polymers which are made from at least one fluorine-containing monomer, but may incorporate monomer(s) which contain no fluorine or other halogen. The fluoropolymer, however, preferably contains at least 35 weight percent fluorine. Examples of fluoropolymers include polymers such as polytetrafluoroethylene (PTFE), perfluoroalkoxy (PFA), fluorinated ethylene propylene (FEP), polyvinylidene fluoride (PVDF), ethylene-tetrafluoroethylene (ETFE), ethylene-chlorotrifluoroethylene (ECTFE), MFA, THV, and mixtures thereof. These polymers may contain one or more monomers in addition to those named. MFA is made from tetrafluoroethylene and perfluoromethylvinylether, and may also include perfluoropropylvinylether monomer. MFA is available from Ausimont S.p.A. THV is made from tetrafluoroethylene, hexafluoropropylene and vinylidene fluoride, and is available from Dyneon. Fluoropolymers possess a unique combination of properties such as high temperature resistance, low electrical conductivity, excellent chemical compatibility, non-stick, low surface tension, and the like. Accordingly, fluoropolymers are often added to other materials, such as other polymers, in order to improve certain physical properties of those materials.

Fluoropolymer dispersions may be used in applications such as coatings and impregnation, or may be coagulated and dried into powders, and eventually extruded into pellets. These powders or pellets may be made into articles such as tubes or insulation for electrical wire and cables by melt or paste extrusion. Alternatively, these powders or pellets may be used as additives in plastics, coatings, and the like.

One type of a fluoropolymer that is sometimes added to other polymers is high molecular weight PTFE polymer powder. High molecular weight PTFE polymer has a tendency to easily agglomerate and fibrillate under shear and thus is difficult to transport and difficult to feed into host materials. Furthermore, high molecular weight PTFE polymer can not be manufactured in small particle sizes. Generally speaking, the polymer produced in known manufacturing processes has a particle size of well above an average of 30 microns.

In order to obtain a homogeneous dispersion of PTFE in a host such as another polymer, an aqueous dispersion of PTFE is sometimes used. The PTFE has average particle sizes of 0.2 to 0.3 microns. If the presence of water is undesirable, then these aqueous dispersions are dried to form fine powder resins. The problem with these powders is that they tend to easily agglomerate and be deformed. The average particle size of the powder is at least 300 microns which causes poor distribution of the PTFE within the host, thereby lowering the efficiency of the PTFE and raising the cost of the final product because a greater amount of PTFE is needed in order to obtain its beneficial effects. Further, PTFE tends to fibrillate, which makes it useful as a drip suppressant in a burning host polymer. However, the PTFE particles obtained by drying an aqueous dispersion may fibrillate prematurely, decreasing the effectiveness of the PTFE as a drip suppressant.

Fluoropolymers such as PTFE are also added as coatings to the surface of certain types of films, such as industrial films made of ethylene copolymers, to reduce the friction between the film and processing equipment, thereby increasing the speed of operation of the equipment. However, such coatings may be from only a micron to a few microns thick, and the PTFE particles are much larger which leads to roughness of the film, poor distribution of PTFE in the film, and the likelihood that the PTFE will easily come off from the film.

What is needed, therefore, is a way to obtain fine powder PTFE particles which do not have the prior art problems of agglomeration, deformation and premature fibrillation and which distribute homogeneously in host materials. Further, there is needed a way to add fine powder PTFE particles to coatings such as films.

One could incorporate the fluoropolymer in the bulk of the host film, but this would increase the costs substantially and unnecessarily, since the desired effect is exclusively on the surface. Furthermore, the presence of the fluoropolymer tends to lower the sealing strength of the bonded films.

What is needed, therefore, are ways to add fluoropolymers such as PTFE to other polymers, to films and other substrates taking advantage of the special properties of fluoropolymers.

SUMMARY OF THE INVENTION

This invention relates to an aqueous dispersion of (a) from 0.5 to 99.5 weight percent of a fluoropolymer having an average particle size of from 0.01 to 30 microns; and (b) from 0.5 to 99.5 weight percent of an ethylene copolymer. These weight percents are based on the total amounts of (a) and (b) only. The ethylene copolymer comprises at least 50% by weight ethylene, 1–35% by weight of an acid-containing unsaturated mono-carboxylic acid, and 0–49% by weight of a moiety selected from at least one of alkyl acrylate, alkyl methacrylate, vinyl ether, carbon monoxide and sulfur dioxide, and further wherein the acid groups are neutralized from 0–100% by a metal ion or other cations.

The invention may be used in the form of this dispersion, or in the form of a coprecipitate of the dispersion. Also, the coprecipitate may be dried to form a dry powder and used in that form or then pelletized to be used as pellets.

The compositions of the invention may be added to a host such as a polymer to make an extruded or molded article or to make a film.

DETAILED DESCRIPTION

Figure 1:
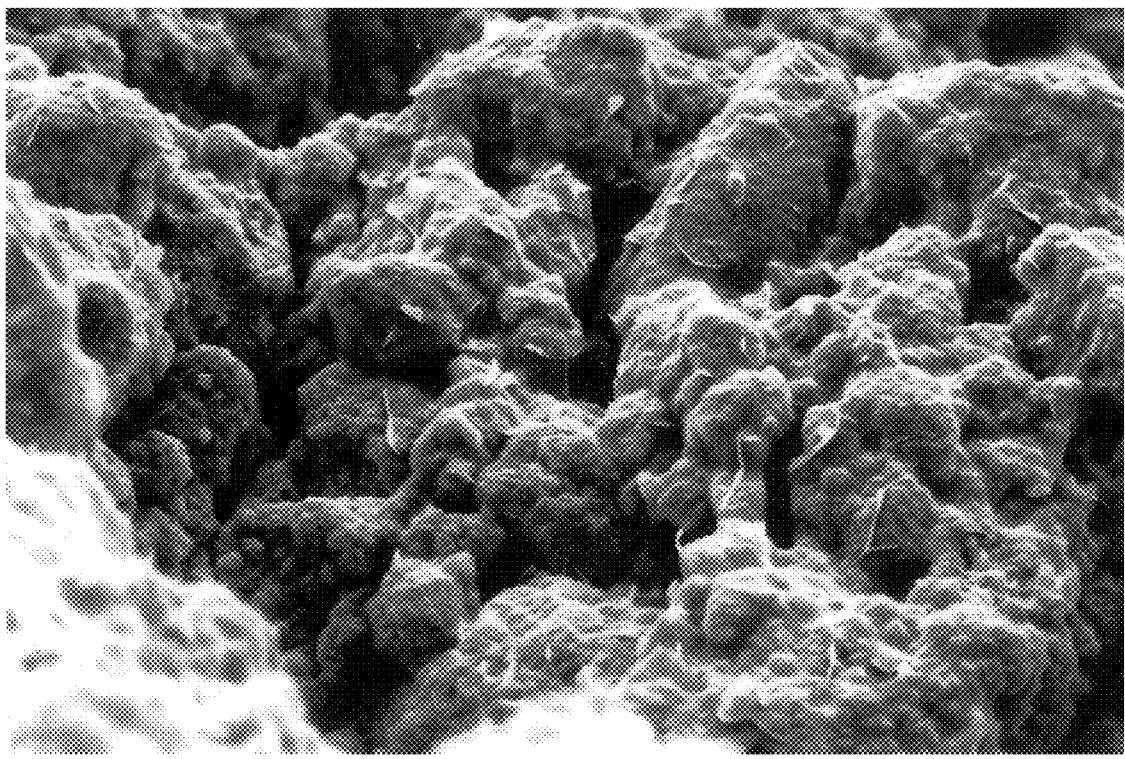
FIG. 1 is a scanning electron microscope picture at a magnification of 500× which shows a co-precipitated dried powder of small particles of PTFE having a thin protective coating of an ethylene copolymer.

This invention relates to an aqueous dispersion of (a) from 0.5 to 99.5 weight percent of a fluoropolymer having a particle size of from 0.01 to 30 microns; and (b) from 0.5 to 99.5 weight percent of an ethylene copolymer, said weight percents based on the total amounts of (a) and (b) only. The invention may be used in the form of the aqueous dispersion, or in the form of a coprecipitate of the aqueous dispersion, or in the form of a dried powder obtained from the aqueous dispersion or coprecipitate. The dry powder may be pelletized to be used as pellets.

Fluoropolymers that can be used in the present invention include non-melt-fabricable fluoropolymer resins having melt viscosity so high, e.g., at least $10^8$ Pa·s, that they cannot readily be shaped by normal melt processing techniques. Such resins include PTFE and TFE polymers (modified PTFE) containing such small concentrations of copolymerizable modifying monomers that the melting point of the resultant polymer is not substantially reduced below that of PTFE, e.g., no lower than 320° C. The modifying monomer can be, for example, HFP, PPVE, PEVE, chlorotrifluoroethylene (CTFE), or other monomer that introduces bulky side groups into the molecule. The concentration of such modifiers is usually less than 1 wt %, more commonly less than 0.5 wt %.

Fluoropolymers that can be used in the present invention also include melt-fabricable fluoropolymer resins. Generally, melt-fabricable fluoropolymer resins have melt viscosity (MV) in the range of $0.5$–$50 \times 10^3$ Pa·s though viscosities outside this range can be used. More commonly, MV is in the range of $1$–$25 \times 10^3$ Pa·s. MV is measured according to ASTM D-1238 at the temperature appropriate for the particular fluoropolymer. Such fluoropolymers include copolymers of TFE with one or more copolymerizable monomers chosen from perfluoroolefins having 3–8 carbon atoms and perfluoro(alkyl vinyl ethers) (PAVE) in which the linear or branched alkyl group contains 1–5 carbon atoms, with comonomer present in sufficient amount to reduce the melting point substantially below that of PTFE, e.g., to a melting point no greater than 315° C. Preferred perfluoropolymers include copolymers of TFE with at least one of hexafluoropropylene (HFP) and PAVE. Preferred comonomers include PAVE in which the alkyl group contains 1–3 carbon atoms, especially 2–3 carbon atoms, i.e. perfluoro(ethyl vinyl ether) (PEVE) and perfluoro(propyl vinyl ether) (PPVE). Additional fluoropolymers that can be used include copolymers (ETFE) of ethylene with TFE, optionally including minor amounts of one or more modifying comonomer such as perfluorobutyl ethylene (PFBE). Other hydrogen-containing fluoropolymers that can be used include copolymers (ECTFE) of ethylene and CTFE, and vinylidene fluoride homopolymers and copolymers.

Examples of fluoropolymers that may be used in this invention include polytetrafluoroethylene, perfluoroalkoxy, fluorinated ethylene propylene, polyvinylidene fluoride, ethylene-tetrafluoroethylene, ethylene-chlorotrifluoroethylene, THV, or mixtures thereof.

The fluoropolymer has an average particle size of from 0.01 to 30 microns, preferably 0.05 to 2 microns, and more preferably 0.05 to 0.4 microns.

Ethylene copolymers that may be used in this invention include ethylene copolymers which comprise at least 50% by weight ethylene, 1–35% by weight of an acid-containing unsaturated mono-carboxylic acid, and optionally 0–49% by weight of a moiety selected from at least one of alkyl acrylate, alkyl methacrylate, vinyl ether, carbon monoxide and sulfur dioxide, and further wherein the acid groups are neutralized from 0–100% by a metal ion.

Preferred ethylene copolymers comprise at least 60% by weight of ethylene, 10–35% by weight of acrylic acid or methacrylic acid and optionally 0–25% by weight of a moiety selected from at least one of methyl acrylate, isobutyl acrylate and n-butyl acrylate and others as above mentioned, and further wherein the acid groups are neutralized from 0–100%, preferably from 30 to 100%, by at least one metal ion preferably lithium, potassium, sodium, zinc, magnesium, aluminum and calcium, or other cations such as ammonium or amino ions.

Suitable preferred ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylate acid/ n-butyl methacrylate, ethylene/acrylic acid/methyl methacrylate, ethylene/acrylic acid/ethyl vinyl ether, ethylene/methacrylic acid/butyl vinyl ether, ethylene/acrylic acid/methyl acrylate, ethylene/methacrylic acid/methyl acrylate, ethylene/methacrylic acid/methyl methacrylate, ethylene/acrylic acid/n-butyl methacrylate, ethylene/methacrylic acid/ethyl vinyl ether and ethylene/acrylic acid/butyl vinyl ether or mixtures thereof. The most preferred ethylene copolymers for use in the compositions of the present invention are ethylene/methacrylic acid and ethylene/acrylic acid copolymers or mixtures thereof.

The ethylene copolymer has an average particle size of from 0.01 to 30 microns, preferable 0.05 to 2 microns, and more preferably 0.05 to 0.4 microns.

The aqueous dispersion of the invention may be made by preparing the fluoropolymer as an aqueous dispersion, preparing the ethylene copolymer as an aqueous dispersion, and then blending the two aqueous dispersions together. This blend of aqueous dispersions may be used as is, or may be coprecipitated and used in that form. Alternatively, the aqueous dispersion or the coprecipitate may be dried to provide a dried powder. The dried powder may be pelletized.

The blends of the invention exhibit excellent compatibility in dispersion form, which makes them useful in storage, transport and application without extra addition of compatibilizers. Because of the small size of the particles and homogeneous aqueous environment, an intimate mixing of the fluoropolymer and the ethylene copolymer is obtained, which is not possible by conventional polymer mixing techniques.

These blends overcome the problem present in the prior art where aqueous dispersions of fine powder PTFE particles, when dried, agglomerate, deform and fibrillate prematurely.

As mentioned above, the blend of the aqueous dispersion of the fluoropolymer and the aqueous dispersion of the ethylene copolymer or its ionomer may be dried to form a coating, a film, an article such as may be made by molding or extrusion, or a powder. In a preferred embodiment, if the aqueous dispersion is dried, such drying should take place above the melting temperature of the ethylene copolymer because it is believed that by doing so the ethylene copolymer forms a protective and binding layer with the fluoropolymer to help prevent the fluoropolymer from agglomerating or becoming deformed. For example, the melting point of the ethylene copolymer may be about 70° C., and thus the ethylene copolymer melts before the fluoropolymer. Thus, the quality of the fluoropolymer does not deteriorate but rather those qualities are retained by the fluoropolymer until it is added to another material and extruded or molded.

This other material may be, for example, a crystalline or semicrystalline or amorphous polymer that is different from both the fluoropolymer and the ethylene copolymer.

It should be noted that the aqueous dispersion of the fluoropolymer and the aqueous dispersion of the ethylene copolymer may be used as a dispersion. In one such application the dispersion is added to a film as a coating. As mentioned above, fluoropolymers have low surface energy and therefore tend not to stick to the surface of films or other types of substrates. However, the addition of the ethylene copolymer to a fluoropolymer as in the aqueous dispersion of the present invention results in a composition which easily adheres to a film or other substrate thus overcoming the difficulties in the prior art.

Fluoropolymers are known for both one of the lowest permeation rates to most fluids and excellent resistance to a very wide range of chemicals. These properties make fluoropolymers an important material for use in the packaging industry. Nevertheless the high cost of fluoropolymer films has hindered the use of these materials for use in the packaging industry, with the exception of small and specialized applications. The blend of the aqueous dispersions of this invention allow the application of thin coats of fluoropolymers to packaging substrates such as polyester films.

Polymer coatings on film substrates such as aluminum foil are known to often have poor water resistance, in other words, the coating tends to separate from the substrate when contacted with water. The blend of the aqueous dispersions of this invention when applied to such substrates have resulted in significantly improved water resistance of the coating on the aluminum film.

Powder coatings of substrates such as films is an area of substantial growth because of the absence of solvents or liquid media with additives, and the absence of a need for liquid coating processes which are generally environmentally undesirable. Furthermore powder coatings involving fluoropolymers require high temperatures since, as a rule, the melting points of fluoropolymers is high compared to other polymers. Another negative of using fluoropolymers in powder coatings lies in their high melt viscosity and the difficulty of attaching them to the substrate, which usually requires the use of a primer.

However, powders obtained by drying the blends of aqueous dispersions of this invention overcome the problems of the prior art. The powders may be applied at lower temperatures, and the application method is simplified due to the good flow characteristics of the powder. Furthermore, the need for primers is not required, due to the good adhesion of the system to the substrate.

Various amounts and types of conventional additives such as surfactants, antifoam, fillers, and the like may be added to the dispersions and the blends of dispersions of the invention.

Example 1 and Comparative Examples 2–4

The following examples show that the composition of this invention which included a fluoropolymer and an ethylene/acid copolymer produced better flame retardancy results than the fluoropolymer alone, the ethylene/acid copolymer alone, or neither the fluoropolymer nor ethylene/acid copolymer.

In example 1, a 35% by weight aqueous dispersion of fibrillating PTFE type 3554-N, sold by DuPont, was mixed with a 25% by weight aqueous dispersion of an ethylene copolymer, the copolymer being of a 20% methacrylic acid/80% ethylene composition, neutralised with sodium hydoxide. The quantities of each dispersion were such that the ratio of dry polymers was 75 parts PTFE and 25 parts ethylene copolymer. The mixed dispersions were subsequently mechanically agitated at 500 rpm until co-precipitation occurred. The composition was dried at a temperature of 105 ° C. This resulted in a dried powder of particles of PTFE which had a thin protective coating of ethylene copolymer as shown in FIG. 1. This powder was mixed with host polyamide 6,6, glass, a non-halogenated flame retardant and a lubricant and was fed into a Werner & Pfleidzer ZSK-30 mm twin screw extruder. This composition was injection molded into test bars which were tested for burning behavior according to Underwriters Laboratory procedure UL 94. Results are classified either NC (not classified) when failing or V-0, V-1 or V-2 depending on various parameters obtained in the test, V-0 being best while V-2 is worst of all the passing ratings.

In comparative Example 2, a composition of polyamide 6,6, glass, a non-halogenated flame retardant and a lubricant without either PTFE or ethylene acid copolymer was injection molded into test bars which were tested for burning behavior according to UL94.

In comparative Example 3, a powder of pure PTFE was prepared from the 3554-N dispersion. This type of powder is commercially sold by DuPont as type 669-N. The powder was added to polyamide 6,6 as in comparative Example 2 and tested for burning behavior according to UL94.

In comparative Example 4, a powder of pure ethylene acid copolymer was prepared from the same dispersion as used in example 1. The powder was added to polyamide 6,6 as in comparative Example 2 and tested for burning behavior according to UL94.

The results of Examples 1–4 are summarized in Table 1 below.

TABLE 1

| Composition in % | Ex. 1 | Comp. Ex. 2 | Comp. Ex. 3 | Comp. Ex. 4 |
|---|---|---|---|---|
| PA66 | 47.70 | 47.75 | 47.70 | 47.70 |
| Glass | 20.0 | 20.0 | 20.0 | 20.0 |
| non-halogenated flame retardants | 32.0 | 32.0 | 32.0 | 32.0 |
| Lubricant | 0.25 | 0.25 | 0.25 | 0.25 |
| PTFE fibrillating powder | — | — | 0.05 | — |
| Blend PTFE/Ethylene Copolymer (75/25) | 0.05 | — | — | — |
| Ethylene-Acid Copolymer | — | — | — | 0.05 |
| UL Burning Classification | V-0 | V-1 | V-1 | V-1 |

The composition of Example 1 achieved a rating of UL V-0 at 1.6 mm. The average burn times were 4.0 seconds for the 48 h/23° C./50%RH test samples and 2.9 seconds for the 168 h/70° C. samples, with no bars burning greater than 10 seconds.

The composition of comparative Example 2 achieved a rating of UL V-1 at 1.6 mm. Average burn times were 6.3 seconds for the 48 h/23° C./50%RH samples with three bars which burned greater than 10 seconds, and 8.6 seconds for the 168 h/70° C. samples, with four bars which burned greater than 10 seconds.

The composition of comparative Example 3 achieved a rating of UL V-1 at 1.6 mm. Average burn times were 3.8 seconds for the 48 h/23° C./50%RH samples with two bars that burned for greater than 10 seconds, and 4.6 seconds for the 168 h/70° C. samples, with two bars which burned greater than 10 seconds.

The composition of comparative Example 4 achieved a rating of UL V-1 at 1.6 mm. Average burn times were 6.7 seconds for the 48 h/23° C./50%RH samples with four bars that burned for greater than 10 seconds, and 7.9 seconds for the 168 h/70° C. samples, with four bars that burned greater than 10 seconds.

The bars were tested according to UL94. For each composition, 10 bars were tested. Five were pretreated 48 hours at 23° C. and 50% relative humidity and five were pretreated 168 hours at 70° C. Each bar was subsequently burned twice. Results were graded following the procedure of UL94.

It may be concluded that while an improvement in the burning behavior due to the addition of PTFE is obtained in both Example 1 and comparative Example 3 as shown by lower average burning times and more bars with burning times of lower than 10 seconds, only the PTFE/ethylene copolymer composition of Example 1 provided the desired results.

Comparative Example 5 and Examples 6–8

In the following examples, a substrate was coated with various coatings. Industrial films, either polymer base such as polyester or metal base such as aluminum, need to be processed at high speeds. Friction between the film and the processing equipment is a problem that limits the speeds and ease of the process. It is well known that various amounts of PTFE and other fluoropolymers on the surface of host films will decrease the friction. Nevertheless, due to the low surface energy of fluoropolymers, these tend not stick to its surface.

The following Examples 6–8 show that the coefficient of friction of a film was reduced using the compositions of the invention.

The substrate tested was an aluminum film having a thickness of 40 microns which was coated using a K-hand coater with a bar no. 2. The uniform wet thickness of the film applied was 12 microns. The coated films were dried in an oven at 110° C. for 15 minutes. Subsequently the films were tested for Coefficient of Friction (COF) and Peel Strength.

In Comparative Example 5, the coating applied to the substrate was an ethylene copolymer dispersion, where the composition of the co-polymer was 80% ethylene and 20% acrylic acid, neutralized with ammonium hydroxide. In Examples 6–8, the coating was a mixed dispersion of a PTFE dispersion type 30-N sold by DuPont, with an average particle size of 0.21 microns and a 60% by weight PTFE content and the ethylene acid copolymer dispersion, which had a nominal particle size of 0.1 microns and a copolymer content of 30% by weight. The relative amount of PTFE dispersion and the ethylene copolymer dispersion in the mixtures tested is as indicated in Table 2. Before coating the mixed dispersions were diluted with water to a level of 13% total solids of ethylene copolymer.

The coefficient of friction (COF) of the films was measured according to method DIN-1894–90. Measurements were done with a 20 N force load at a crosshead speed of 152 mm/min. Film to film COF was evaluated by applying a 200 g weight sled on the film wrapped with a coated Al film (coated side to coated side).

TABLE 2

| Example No. | Ethylene Copolymer plus: | Average static COF | Average kinetic COF | % reduction static COF vs. standard | % reduction kinetic COF vs. standard |
|---|---|---|---|---|---|
| C5 | 0% PTFE | 1.14 | 0.78 | — | — |
| 6 | 1% PTFE | 0.85 | 0.61 | 25 | 22 |
| 7 | 5% PTFE | 1.04 | 0.45 | 9 | 42 |
| 8 | 10% PTFE | 0.59 | 0.43 | 48 | 45 |

The results in Table 2 show that the coefficient of friction of a the films was significantly reduced by using a coating of an aqueous dispersion that was a blend of an aqueous dispersion of a fluoropolymer and an aqueous dispersion of a ethylene copolymer compared to a coating of nothing.

Comparative 9 and Example 10

The peel strength of the films made in Comparative Example 5 and Example 7 were measured according to the following test procedure. The coated films were heat sealed with a precision bar heat sealer, a Kopp type PK110 at 90 psi pressure for one second. Heat sealed sample coated films were peeled apart by a tensile testing machine Zwick type 1435 at a 90° angle in the machine direction and a crosshead speed of 100 mm/min. The sealing strength was measured for various sealing temperatures, and the results have been listed in table 3 below:

TABLE 3

| Sealing Temperature (° C.) | Comparative Example 9 Average Peel strength (N/15 mm) Ethylene Copol., no PTFE | Example 10 Average Peel strength (N/15 mm) Ethylene Cop + 5% PTFE |
|---|---|---|
| 50 | 0.24 | 0.10 |
| 60 | 1.41 | 1.42 |
| 70 | 3.21 | 3.77 |
| 80 | 6.13 | 6.97 |
| 90 | 7.50 | 8.38 |
| 100 | 7.87 | 8.57 |
| 110 | 7.37 | 8.33 |
| 120 | 5.70 | 8.60 |

These Examples show that a coating of an aqueous dispersion that was a blend of an aqueous dispersion of a fluoropolymer and an aqueous dispersion of an ethylene copolymer had an improved peel strength compared to a coating of ethylene copolymer alone.

Comparative Example 11 and Example 12

The water resistance of the films prepared in the same manner as in Comparative Example 5 and Example 7, but where the ethylene copolymer had a composition of 85% ethylene and 15% methacrylic acid, neutralized with sodium hydroxide, was measured in the following manner: the films were immersed in deionized water at room temperature and visually inspected after 8 and 20 days. The observations obtained are listed below in table 4

TABLE 4

| | Comparative Example 11 Ethylene Copolymer | Example 12 Ethylene Copolymer + 5% PTFE |
|---|---|---|
| Aspect after 8 days immersion in water | Polymer coating starting to separate from aluminum film | No separation observed |
| Aspect after 20 days immersion in water | Complete separation of coating from aluminum film | Polymer coating starting to separate from aluminum film |

What is claimed is:

1. A composition which comprises an aqueous dispersion of
   (a) from 0.5 to 99.5 weight percent of a fluoropolymer having an average particle size of from 0.05 to 0.4 microns, said fluoropolymer comprising fibrillating polytetrafluoroethylene; and
   (b) from 0.5 to 99.5 weight percent of an ethylene copolymer which comprises at least 50% by weight ethylene, 1–35% by weight of an acid-containing unsaturated mono-carboxylic acid, and 0–49% by weight of a moiety selected from at least one of alkyl acrylate, alkyl methacrylate, vinyl ether, carbon monoxide and sulfur dioxide, and further wherein the acid groups are neutralized from 0–100% by a metal ion or other cations, said weight percents based on the total amounts of (a) and (b) only.

2. The composition of claim 1, wherein the ethylene copolymer comprises at least 60% by weight of ethylene, 10–35% by weight of acrylic acid or methacrylic acid and 0–25% by weight of a moiety selected from at least one of methyl acrylate, iso-butyl acrylate and n-butyl acrylate and others as above mentioned, and further wherein the acid groups are neutralized from 0–100% by at least one metal ion selected from lithium, potassium, sodium, zinc, magnesium, aluminum and calcium.

3. The composition of claim 1, wherein the acid groups are neutralized from 30–100%.

4. The composition of claim 1, wherein the ethylene copolymer is ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylate acid/n-butyl methacrylate, ethylene/acrylic acid/methyl methacrylate, ethylene/acrylic acid/ethyl vinyl ether, ethylene/methacrylic acid/butyl vinyl ether, ethylene/acrylic acid/methyl acrylate, ethylene/methacrylic acid/methyl acrylate, ethylene/methacrylic acid/methyl methacrylate, ethylene/acrylic acid/n-butyl methacrylate, ethylene/methacrylic acid/ethyl vinyl ether, or ethylene/acrylic acid/butyl vinyl ether or mixtures thereof.

5. The composition of claim 1, wherein the ethylene copolymer is ethylene/methacrylic acid or an ethylene/acrylic acid copolymer or mixtures thereof.

6. The composition of claim 1, wherein the ethylene copolymer has an average particle size of from 0.1 to 30 microns.

7. A composition which is a coprecipitate of the composition of claim 1.

8. A composition which is a dried powder of the composition of claim 1.

9. A polymer composition comprising a crystalline or semi-crystalline or amorphous polymer and the composition of claim 8.

10. An article made from the composition of claim 1.

11. An article made from the polymer composition of claim 9.

12. A coating made from the composition of claim 1.

13. A substrate having a coating made from the composition of claim 1.

14. A process for preparing a blend of a fluoropolymer and an ethylene copolymer comprising the steps of, providing an aqueous dispersion of a fluoropolymer, said fluoropolymer comprising fibrillating polytetrafluoroethylene, providing an aqueous dispersion of an ethylene copolymer which comprises at least 50% by weight ethylene, 1–35% by weight of an acid-containing unsaturated mono-carboxylic acid, and 0–49% by weight of a moiety selected from at least one of alkyl acrylate, alkyl methacrylate, vinyl ether, carbon monoxide and sulfur dioxide, and further wherein the acid groups are neutralized from 0–100% by a metal ion or other cations, blending the two aqueous dispersions together to form a blend of (a) from 0.5 to 99.5 weight percent of a fluoropolymer having an average particle size of from 0.05 to 0.4 microns and (b) from 0.5 to 99.5 weight percent of an ethylene copolymer, said weight percents based on the total amounts of (a) and (b) only.

15. The process of claim 14, further comprising the step of applying said blend of aqueous dispersions to a substrate.

16. The process of claim 14, further comprising the step of drying said blend of aqueous dispersions to form a dry powder of fluoropolymer and an ethylene copolymer.

17. The process of claim 16, further comprising the steps of adding said dry powder to a crystalline, semi-crystalline or amorphous polymer to make a polymer composition and forming an article from said polymer composition.

18. The substrate having a coating of claim 13 wherein said substrate is selected from the group consisting of aluminum foil and polyester film.

\* \* \* \* \*